US006600622B1

(12) United States Patent
Smith

(10) Patent No.: US 6,600,622 B1
(45) Date of Patent: Jul. 29, 2003

(54) SYSTEM AND METHOD FOR DETECTING DISPLACEMENT OF DISK DRIVE HEADS ON MICRO ACTUATORS DUE TO CONTACT WITH DISKS

(75) Inventor: Gordon James Smith, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 09/502,879

(22) Filed: Feb. 11, 2000

(51) Int. Cl.[7] ............................................. G11B 5/596
(52) U.S. Cl. ..................... 360/77.06; 360/75; 360/77.03
(58) Field of Search .................................. 360/75, 77.02, 360/77.08, 78.05, 234.7, 294.3, 77.03, 77.06

(56) References Cited

U.S. PATENT DOCUMENTS

| | | | | |
|---|---|---|---|---|
| 5,862,015 A | * | 1/1999 | Evans et al. .............. 360/75 X |
| 5,991,114 A | * | 11/1999 | Huang et al. ................. 360/75 |
| 6,023,963 A | * | 2/2000 | Schaenzer et al. ............ 73/105 |
| 6,088,185 A | * | 7/2000 | Ratliff et al. ............ 360/77.03 |
| 6,166,874 A | * | 12/2000 | Kim ............................. 360/75 |
| 6,211,638 B1 | * | 4/2001 | Heaton et al. ....... 360/78.05 X |

FOREIGN PATENT DOCUMENTS

JP 4271072 A * 9/1992

* cited by examiner

Primary Examiner—David Hudspeth
Assistant Examiner—James L Habermehl
(74) Attorney, Agent, or Firm—Bracewell & Patterson, LLP; Roy W. Truelson

(57) ABSTRACT

A disk drive with a detector circuit is connected to the distal end of a two-stage actuator. The actuator has a micro actuator for fine track positioning of a read/write head relative to a disk. Intermittent contact between the head and the disk produces forces that are detected and measured by the micro actuator drive circuitry. These measurements are used to determine if excessive contact is occurring between the head and the disk. Alternatively, the present invention also uses a differential method where the output signals from multiple micro actuators are compared to improve noise immunity. In addition, comparisons between the forces at the proximal and distal ends of the micro actuators are used to better identify the source of such forces. For example, this allows the system to distinguish between common mode forces such as those generated by windage and flex cable bias, from forces generated by intermittent head-disk contacts.

14 Claims, 6 Drawing Sheets

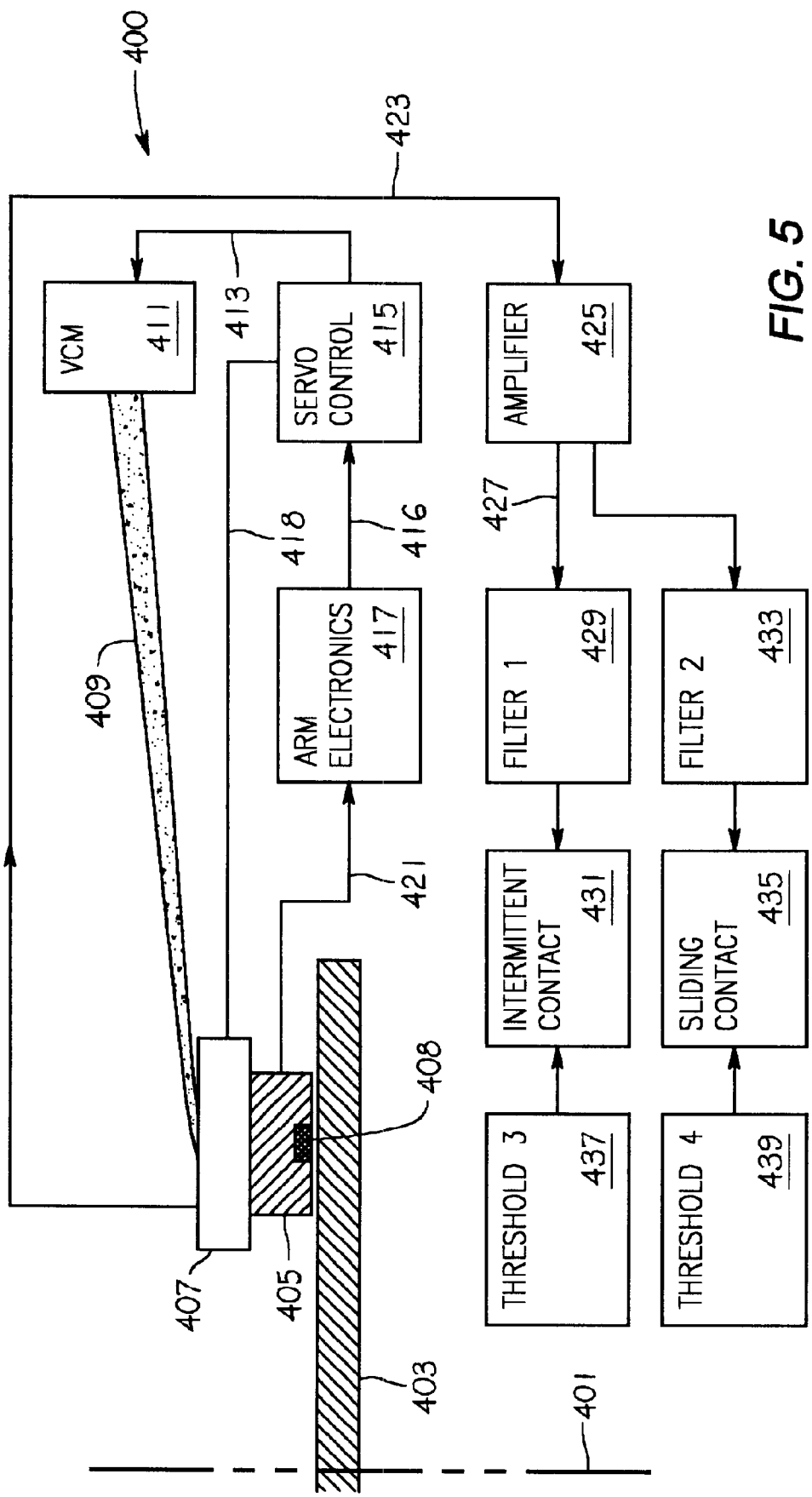

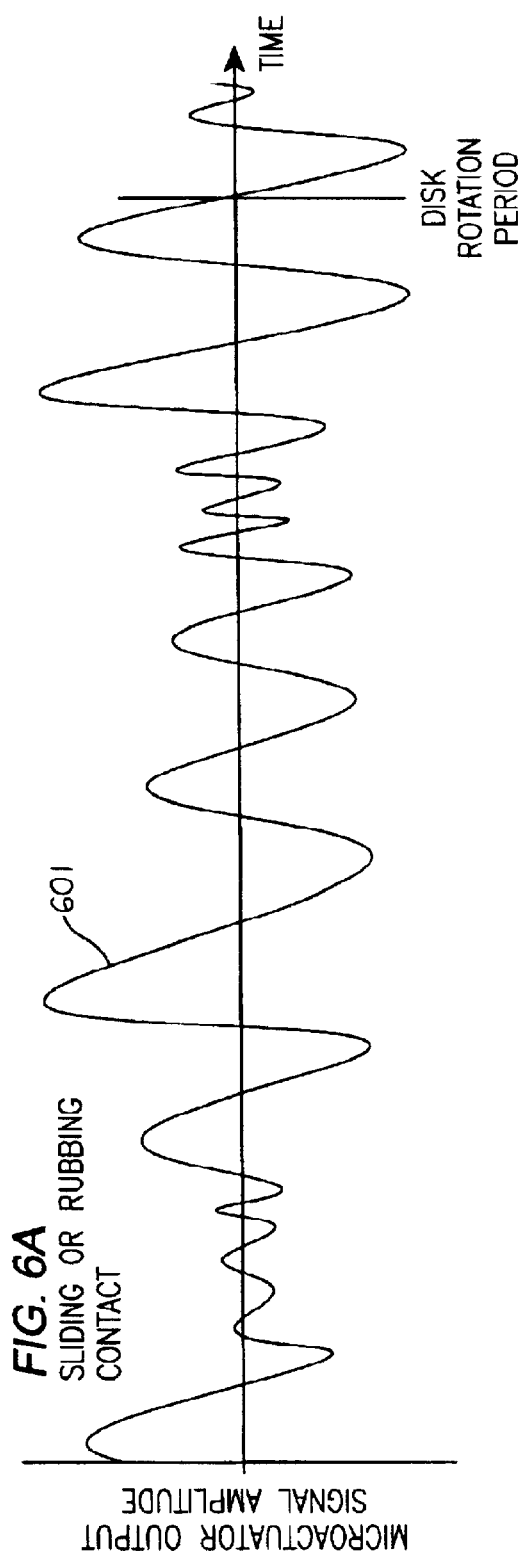
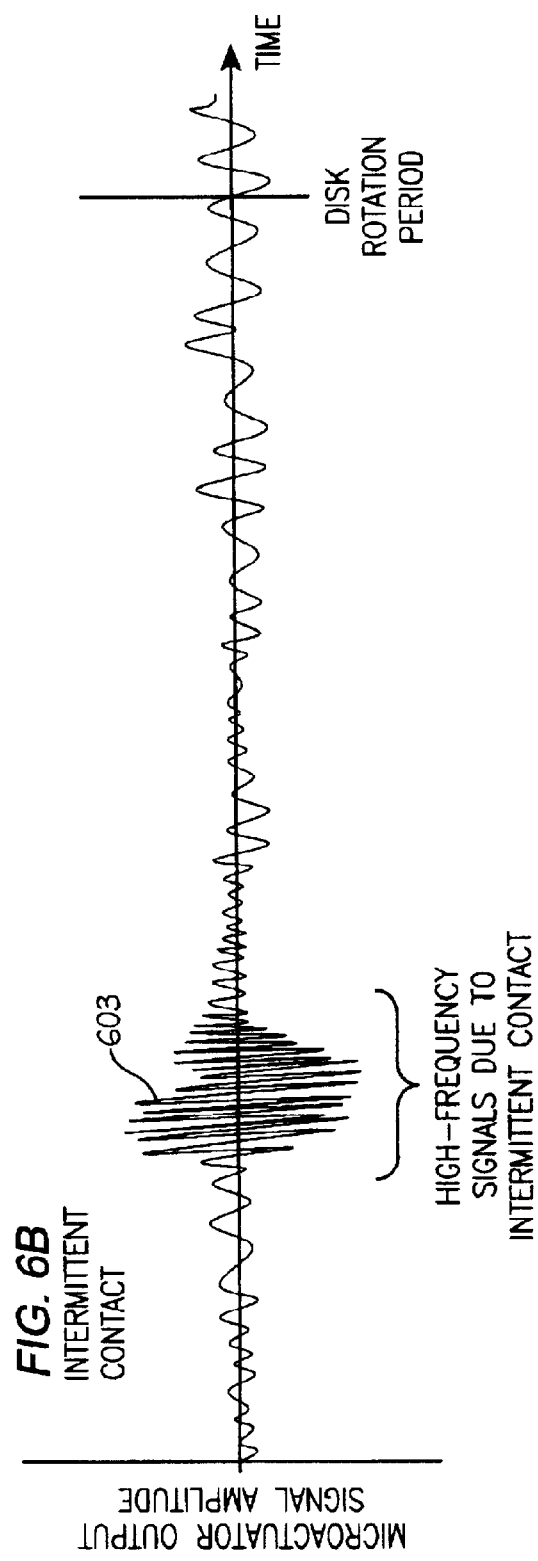

SYSTEM AND METHOD FOR DETECTING DISPLACEMENT OF DISK DRIVE HEADS ON MICRO ACTUATORS DUE TO CONTACT WITH DISKS

BACKGROUND OF THE INVENTION

1. Technical Field

This invention relates in general to an improved disk drive and in particular to detecting displacement of the actuator in a disk drive. Still more particularly, the invention relates to using the micro actuator transducer in a disk drive as a sensor for sensing head displacement due to contact with a rotating disk.

2. Description of the Prior Art

A disk drive utilizes actuators for reading and writing data to its rotating disks. The radial positions of the actuators, relative to tracks on the disks, are typically controlled by a transducer in a closed-loop servo system. Some disk drives utilize two-stage actuators for reading and writing to the disks. A two-stage actuator comprises a primary actuator arm and a micro actuator arm that is pivotally mounted to and extends from a distal end of the primary actuator arm. The micro actuator arm has one or more heads on its distal end for interacting with a respective disk. The micro actuator arm also has a smaller mass and therefore significantly higher mechanical bandwidth than the primary actuator arm.

During operation of the disk drive, the heads on the micro actuator arms occasionally will contact the spinning disks, thereby subjecting the micro actuator arms to radial displacement relative to the disks. In the prior art, in-situ schemes such as magnetic envelope or thermal MR sensing are used to detect this displacement. Magnetic sensing is difficult in that one must distinguish between track misregistrations from head-disk contact events. Moreover, thermal MR measurements require additional drive circuitry which adds significant cost to the device.

However, the relative displacement of the distal and proximal ends of the micro actuator arms are indicative of the sliding forces generated during head-disk contacts. Since these contact-generated displacements did not originate from the controlling servo system, they appear as intermittent signals that are unlikely to occur during position error signal measurements. Thus, it would be desirable to control the micro actuator arm while distinguishing disk contact with the micro actuator arm without adding additional circuitry. Such a system for controlling and monitoring the actuator would be both simpler and more robust than prior art methods.

SUMMARY OF THE INVENTION

The present invention utilizes a disk drive with a simple detector circuit that is connected to the distal end of a two-stage actuator. The actuator has a micro actuator that is used for fine track positioning of a read/write head relative to a disk. Intermittent contact between the head on the micro actuator and the disk produces forces that are detected and measured by the micro actuator drive circuitry. These measurements are used to determine if excessive contact is occurring between the head and its respective disk, and for predictive failure analysis or recovery operations.

Alternatively, the present invention also comprises a differential method where the output signals from multiple micro actuators are compared in order to improve noise immunity. In addition, comparisons between the forces at the proximal and distal ends of any of the micro actuators are used to better identify the source of such forces. For example, this allows the system to distinguish between common mode forces such as those generated by windage and flex cable bias, from forces generated by intermittent head-disk contacts.

Another embodiment of the invention is to use the micro actuator as a detector for slider-disk contact that does not utilize a position error signal. In this mode, the track position is maintained by using the arm actuator. A signal from the micro actuator is used to electronically detect the slider-disk contact. The signal is available since the motor also functions as a generator, e.g., piezoelectric or voice coil-based micro actuators, or any micro actuator that is capable of generating a signal in response to an applied force or displacement.

Accordingly, it is an object of the present invention to provide an improved disk drive.

It is an additional object of the present invention to provide a system and method for detecting displacement of the actuator in a disk drive.

Still another object of the present invention is to use the micro actuator transducer in a disk drive as a sensor for sensing head displacement due to contact with a rotating disk.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 5 is a schematic diagram of a third embodiment of the disk drive of FIG. 2.

FIGS. 6A and 6B are plots of micro actuator output signals over time indicating sliding and intermittent contact, respectively.

DETAILED DESCRIPTION OF THE PREFERRED EMBODIMENT

Figure 1:
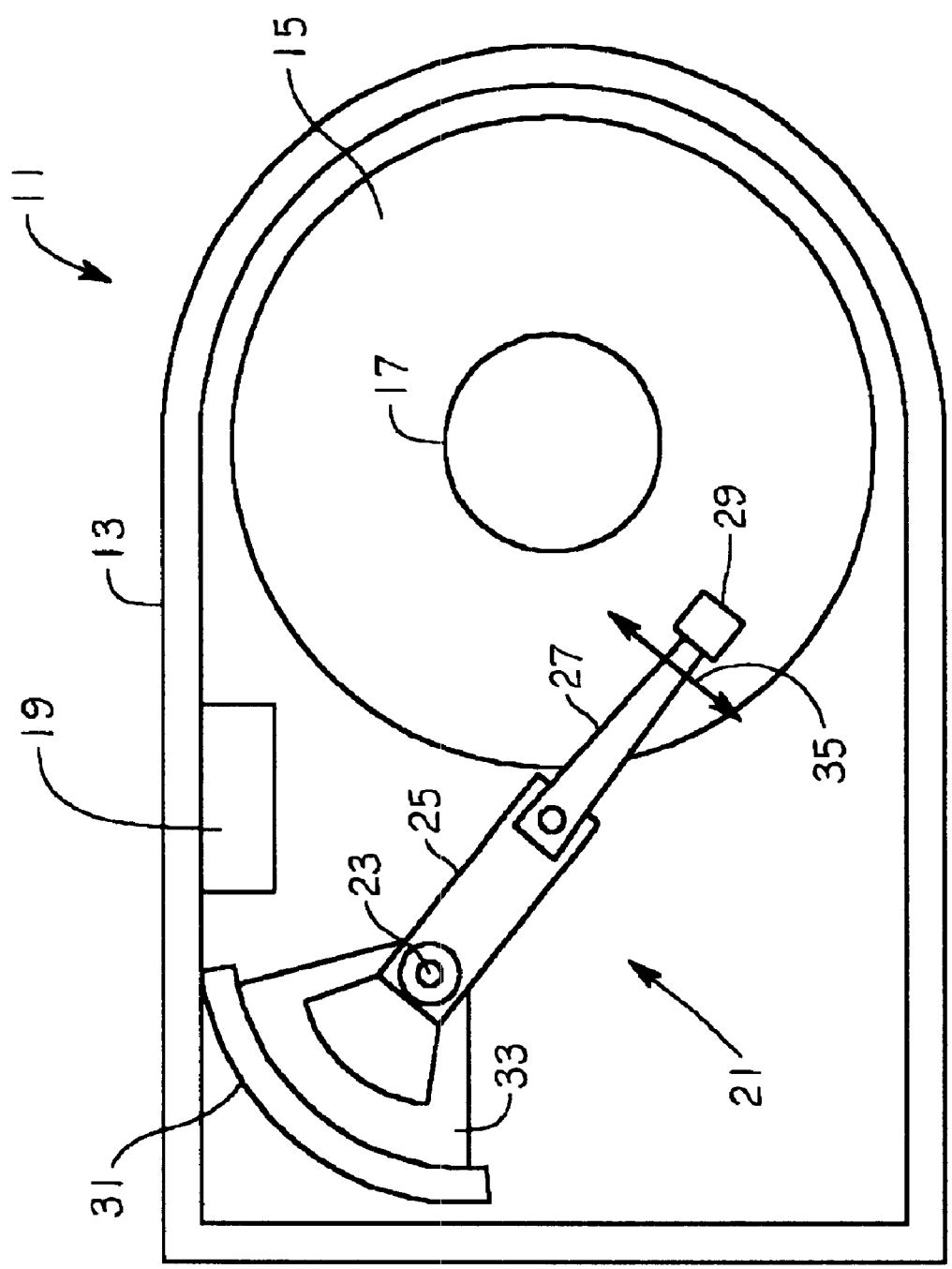
FIG. 1 is a schematic drawing of a disk drive.

Referring to FIG. 1, a schematic drawing of an information storage system comprising a magnetic hard disk file or drive 11 for a computer system is shown. Drive 11 has an outer housing or base 13 containing a plurality of stacked, parallel magnetic disks 15 (one shown) which are closely spaced apart. Disks 15 are rotated by a spindle motor located therebelow about a central drive hub 17. A plurality of stacked, parallel actuator arms 21 (one shown) are pivotally mounted to base 13 about a pivot assembly 23. A controller 19 is mounted to the base for selectively moving arms 21 relative to disks 15.

In the embodiment shown, each arm 21 comprises a mounting support 25, a pair of parallel, cantilevered load beams or suspensions 27 extending from each mounting support 25, and a head gimbal assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor assembly 31 having a conventional voice coil motor is also mounted to pivot assembly 23 opposite head gimbal assemblies 29. Movement of an actuator driver 33 (indicated by arrow 35) moves head gimbal assemblies 29 radially across tracks on the disks 15 until the heads on assemblies 29 settle on the target tracks. The head gimbal assemblies 29 operate in a conventional manner and always move in unison with one another, unless drive 11 uses a split actuator (not shown) wherein the arms move independently of one another.

Figure 2:
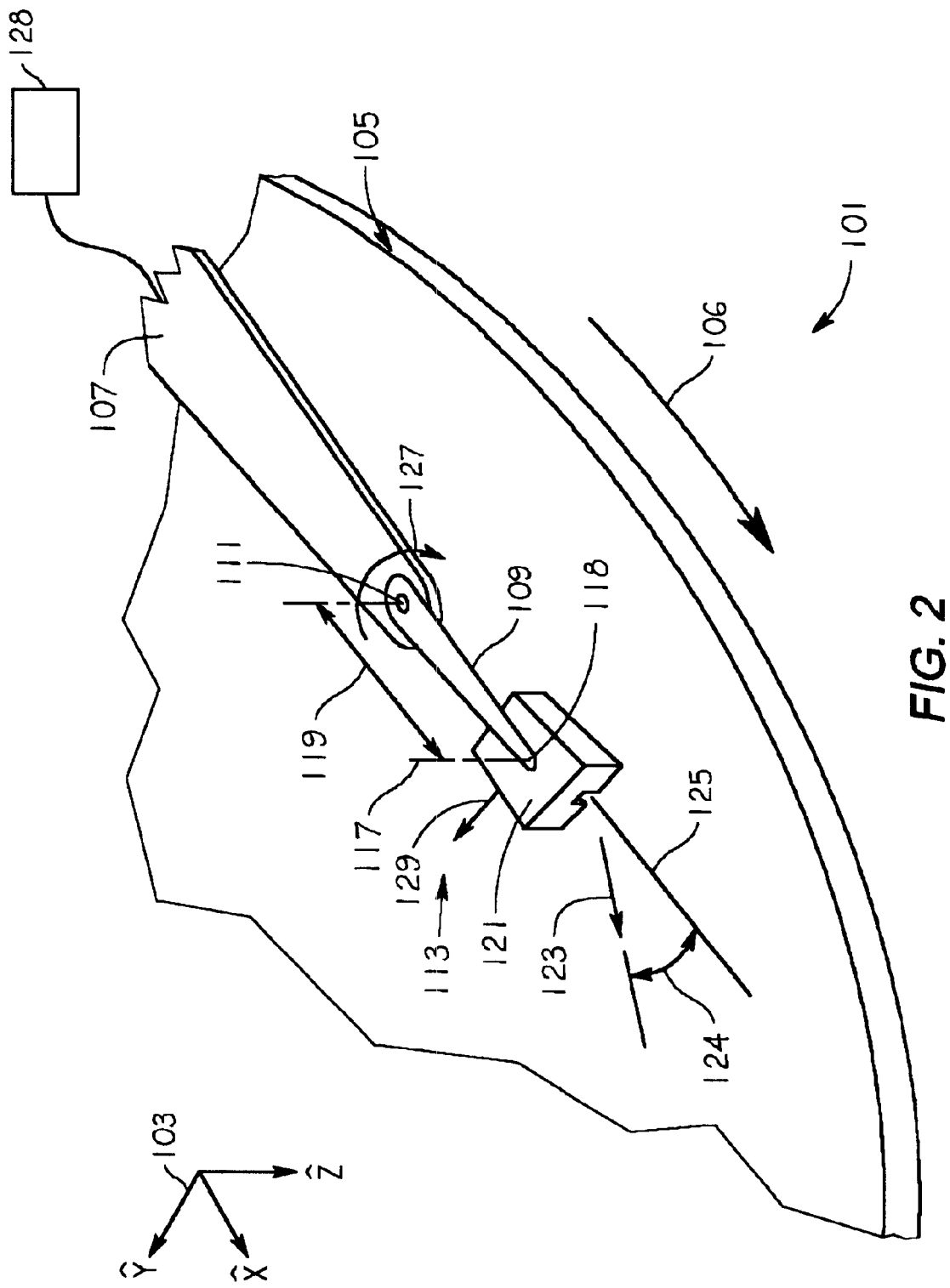
FIG. 2 is an enlarged schematic isometric view of a first embodiment of a disk drive constructed in accordance with the invention.

Referring now to FIG. 2, a first embodiment of a disk drive 101 constructed in accordance with the invention is shown, along with a Cartesian coordinate system 103 for reference purposes. Drive 101 has a magnetic disk 105 that rotates at an angular velocity 106 about an axis that is parallel to the z-axis of coordinate system 103. Drive 101 also has an actuator assembly 113 for reading data from and writing data to disk 105. Although only one disk 105 and actuator assembly 113 are shown, it should be apparent that a plurality of components may be employed simultaneously in drive 101.

A head or slider 121 is suspended above the surface of the spinning disk 105 by a head/gimbal assembly (HGA) 118. The HGA 118 is mounted to the distal end of a micro actuator arm 109. The proximal end of micro actuator arm 109 is pivotally mounted near the distal end of a primary actuator arm 107 at pivot point 111. The surface velocity of disk 105, represented by vector 123, is at an angle 124 relative to a longitudinal axis 125 of actuator assembly 113. Axis 125 is parallel to the x-axis of coordinate system 103.

Occasionally, slider 121 will physically contact the spinning disk 105 and a contact force develops in the same direction as the disk velocity vector 123. The contact force has a y-axis component 129 that is perpendicular to longitudinal axis 125. Force component 129 of the contact force acts at a distance 119 from the micro actuator pivot point 111 to the location 117 of the slider/disk contact. When force component 129 acts at distance 119, a moment 127 is produced about micro actuator pivot point 111. Moment 127 causes undesirable rotation of micro actuator arm 109, relative to primary actuator arm 107.

The rotation of micro actuator arm 109 must be counteracted by the drive's servo track positioning system or transducer, indicated schematically at block 128. Displacements due to head-disk contact are detectable as back-EMF if the micro actuator is a voice coil, or voltage spikes at the input driver if the micro actuator is piezoelectric, for example. The resulting error signal produced by transducer 128 as a result of the rotation of micro actuator arm 109 therefore detects and gives an indication of the slider/disk contact. For example, if slider 121 is in near-constant or constant sliding contact with disk 105, the error signal will have primarily lower frequency signals as shown by plot 601 in FIG. 6A. However, if the contact between slider 121 and disk 105 is intermittent in nature, the error signal will have higher frequencies as shown by plot 603 in FIG. 6B. In this sense, the existing transducer 128 in disk drive 101 is adapted to perform two functions: it controls the radial position of the actuator assembly 113 relative to disk 105, and it senses displacement of slider 121 due to contact with disk 105.

Figure 3:
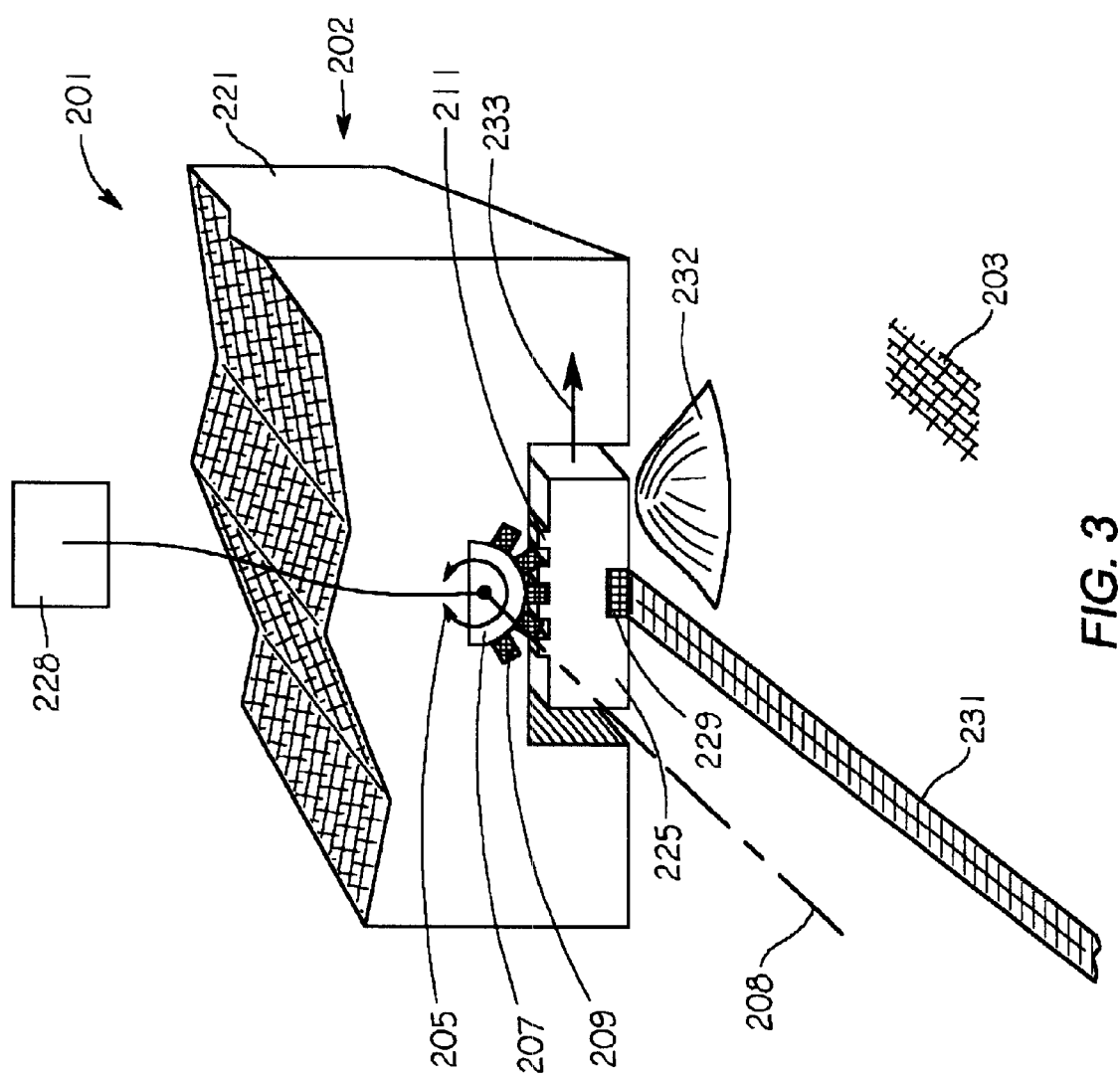
FIG. 3 is an enlarged schematic isometric view of a second embodiment of the disk drive of FIG. 2.

Referring now to FIG. 3, a second embodiment of the invention is illustrated as disk drive 201. Like drive 101, drive 201 has an actuator assembly 202 that pivots relative to a rotating disk 203. A slider 221 is suspended above disk 203 on actuator assembly 202. Slider 221 has magnetic elements 229 for reading data from and writing data to filamentary recording tracks 231 (one shown). The magnetic elements 229 are mounted to a movable portion 225 on slider 221. Portion 225 can be moved laterally (left or right in FIG. 3) relative to slider 221 via a drive element 207. In the embodiment shown, portion 225 is elastically attached to slider 221 and drive element 207 is a rotary gear with a longitudinal axis 208 and teeth 209 that interface with a gear 211 on portion 225. Gear 207 rotates as shown at arrows 205. Other interfacing means between portion 225 and slider 221 also may be employed.

In normal operation, movable portion 225 is driven by gear 207 so that reading and writing elements 229 remain over the desired track 231 for interaction therewith. However, occasionally contact will occur between portion 225 and disk 203, e.g., a mechanical protrusion 232 on disk 203 will physically contact the movable portion 225. Such contact produces a lateral force (represented by vector 233), which produces a slight rotation of gear 207. This rotation is counteracted by the driver's servo track positioning system or transducer 228. The resulting error signal produced as a result of the rotation of portion 225 therefore detects and gives an indication of the slider/disk contact, as described above for the previous embodiment. Thus, transducer 228 in disk drive 201 controls the radial position of the actuator assembly 202 relative to disk 203, and it senses displacement of slider 221 due to contact with disk 203.

Figure 4:
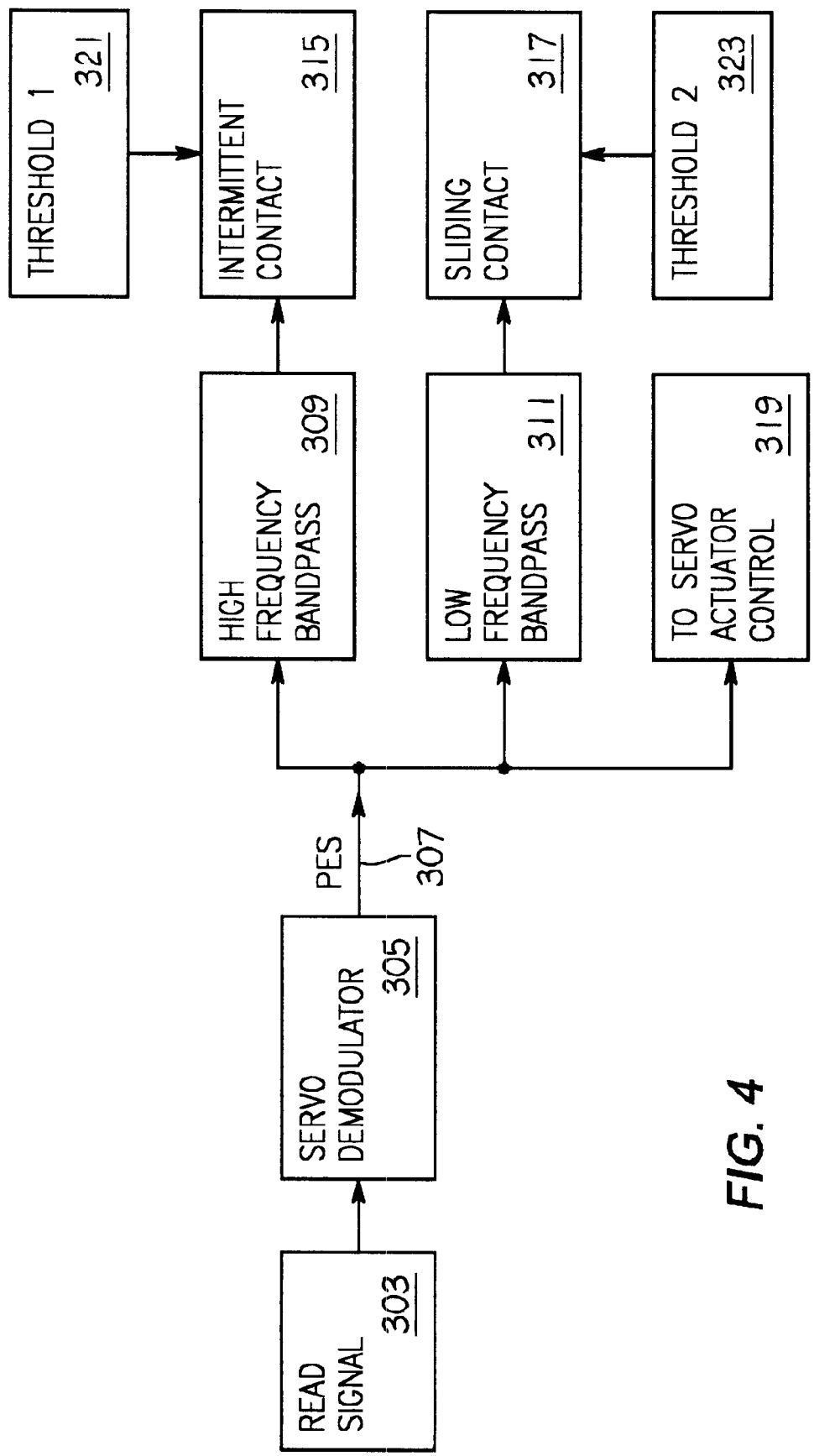
FIG. 4 is a block diagram of a signal detection and classification system for the disk drives of FIGS. 2 and 3.

Referring now to FIG. 4, a block diagram of a signal detection and classification system 301 for the disk drives 101, 201 is shown. As illustrated at block 303, a read signal is obtained from a magnetic reproducing head, which comprises both recorded data and servo information read from the disk. Read signal 303 is processed by a servo demodulator, as depicted at block 305. Servo demodulator 305 generates a resulting or position error signal (PES) 307. The PES 307 is distributed to a plurality of elements for classification of the displacement. For example, the PES 307 is processed by a high frequency, electronic bandpass filter, illustrated at block 309, which is tuned to detect PES frequencies that correspond to intermittent contact (depicted at block 315). The PES 307 is also delivered to an electronic bandpass filter 311 which is tuned to detect lower PES frequencies that correspond to continuous or near-continuous slider/disk contact, as illustrated at block 317. In addition, the PES 307 is sent to the servo micro actuator control loop 319 for correcting any track misregistration. Although only two PES detection filters are shown and described, additional filters may be added to detect PES frequencies that correspond to other mechanical phenomenon.

In one version of the invention, the outputs at blocks 315 and 317 are compared against thresholds 321, 323 to determine if the energy of PES 307 is excessive in regard to the intermittent or continuous contact, respectively. Thresholds 321, 323 may be determined and set in a variety of ways. For example, if the drive is operating in an environment with excessive noise or vibration, the thresholds may be set accordingly to reduce false alarms. Alternatively, the thresholds can be triggered based on statistical analysis to determine, for example, if any of the individual heads or micro actuators have deviated as statistical outliers. In the preferred embodiment, thresholds 321, 323 are determined during the manufacturing of the disk drive by analyzing the PES signals from each head to determine the normal operational range of outputs 315, 317 (e.g., without intermittent or sliding contact). Thus, system 301 has a look-up table for these threshold values for each head. Moreover, the inner, middle, and outer disk tracks for each head may be provided with different thresholds to account for conditions such as air turbulence and disk flutter at the outer disk diameter, for example. When a particular head is selected, the appropriate look-up threshold is compared with the values of outputs 315, 317.

A third embodiment of the invention is illustrated as disk drive 400 in FIG. 5. Disk drive 400 uses a micro actuator 407 as a transducer or detector for detecting contact between its slider 405 and disk 403 without the use of a position error signal. Slider 405 has a read element 408 and flies above disk 403 as disk 403 rotates about an axis 401. Slider 405 is maintained over a desired track on disk 403 by amplifying the readback signal 421 from read element 408 and using an arm electronics module 417 which amplifies and filters readback signal 421. The amplified signal 416 from the arm electronics module 417 is passed to a servo control 415 which provides a control signal 413 to a voice coil motor (VCM) 411. The VCM 411 controls the radial position of slider 405 via a suspension 409. The servo control 415 also may control the position of the read element 408 through the micro actuator 407 via a control signal 418.

In addition, an output signal 423 from micro actuator 407 is delivered to an amplifier 425. The output signal 423 comprises back EMF, piezoelectric signals, or other signals obtained from micro actuator 407. In the embodiment shown, the amplified signal 427 is passed through one or more filters 429, 433 to isolate signal frequencies which indicate the type of slider-disk contact that is occurring, as described for the previous embodiment. The filters 429, 433 may be bandpass filters or other suitable filters and produce filtered output signals 431, 435 that type the slider-disk contact as intermittent or continuous. The outputs 431, 435 are compared against thresholds 437, 439, respectively, to determine if they are excessive. Thus, drive 400 also has a look-up table for the threshold values for each head.

Note that the invention could use a filter bank of any size in order to discriminate between sliding contact, intermittent contact, or other sources. Alternatively, a frequency analysis of the PES 307 (FIG. 3) or output signal 423 (FIG. 4) may be performed. If these signals are in digital form, for example, a Fast Fourier Transform (FFT) could be used to analyze the frequency content of the signals. From the spectrum, one could determine if sliding or intermittent contact is present by comparing the magnitude of the frequencies in an appropriate frequency band to a threshold.

The invention has several advantages including the ability to allow the system to distinguish between track misregistrations and head-disk contact events with a simpler and more robust design as compared to other in-situ techniques. When a micro actuator is used, displacements due to head-disk contact are detectable as back-EMF if the micro actuator is a voice coil, or voltage spikes at the input driver if the micro actuator is piezoelectric. The system also distinguishes between track misregistrations and head-disk contact events. Furthermore, the system requires no additional drive circuitry thereby minimizing the cost of the feature. The invention also may be used for predictive failure analysis or recovery operations.

While the invention has been shown or described in only some of its forms, it should be apparent to those skilled in the art that it is not so limited, but is susceptible to various changes without departing from the scope of the invention.

What is claimed is:

1. A disk drive, comprising:
   a rotatable disk having a plurality of tracks;
   an actuator assembly movable relative to the disk and having a longitudinal axis and a slider for reading data from and writing data to the tracks on the disk;
   a track positioning system for controlling a radial position of the slider relative to the tracks on the disk; and
   wherein
   when at least a portion of the slider is displaced relative to the longitudinal axis of the actuator assembly due to contact with the disk, the track positioning system senses displacement of the slider and produces an error signal in response thereto in order to detect and give an indication of said contact, said error signal being derived from a read signal for reading data on said disk produced by said slider.

2. The disk drive of claim 1 wherein the actuator assembly comprises a primary actuator and a micro actuator mounted thereto.

3. The disk drive of claim 1 wherein the actuator, assembly is rotatable and the track positioning system senses rotation of the actuator assembly.

4. The disk drive of claim 1 wherein when the slider makes near constant sliding contact with the disk, the track positioning system produces a low frequency error signal in response thereto.

5. The disk drive of claim 1 wherein when the slider makes intermittent contact with the disk, the track positioning system produces a high frequency error signal in response thereto.

6. The disk drive of claim 1 wherein the slider has a movable portion containing elements for reading and writing to the tracks, and a drive element for adjusting a position of the movable portion relative to the tracks on the disk.

7. The disk drive of claim 6 wherein the drive element is a gear.

8. The disk drive of claim 6 wherein the drive element is located between the actuator assembly and the slider.

9. The disk drive of claim 1 wherein the track positioning system includes a transducer.

10. The disk drive of claim 1 wherein the track positioning system utilizes thresholds to give the indication of said contact.

11. The disk drive of claim 1 wherein the track positioning system detection and classification system, comprising:
    a servo demodulator for processing said read signal from the slider and producing a position error signal in response thereto:
    a high frequency bandpass filter for processing the position error signal in response to intermittent contact between the slider and the disk;
    a low frequency bandpass filter for processing the position error signal in response to continuous contact between the slider and the disk; and a servo control loop for processing the position error signal and correcting track misregistrations between the slider and the disk.

12. A method for detecting and classifying movement signals in a disk drive, comprising the steps of:
 (a) obtaining a readback signal from a slider that has been subjected to a displacement relative to a track on a disk;
 (b) amplifying and filtering the readback signal and generating an amplified signal in response thereto, to detect at least one frequency that corresponds to contact between the slider and the disk; and
 (c) processing the amplified signal into a control signal for a control device that repositions the slider relative to said track on the disk.

13. The method of claim 12 wherein step (b) comprises detecting frequencies that correspond to both intermittent contact between the slider and the disk, and frequencies that correspond to near continuous contact between the slider and the disk.

14. The method of claim 12 wherein the displacement is classified by comparing the amplified signal to a threshold.

* * * * *